United States Patent Office 3,319,126
Patented May 9, 1967

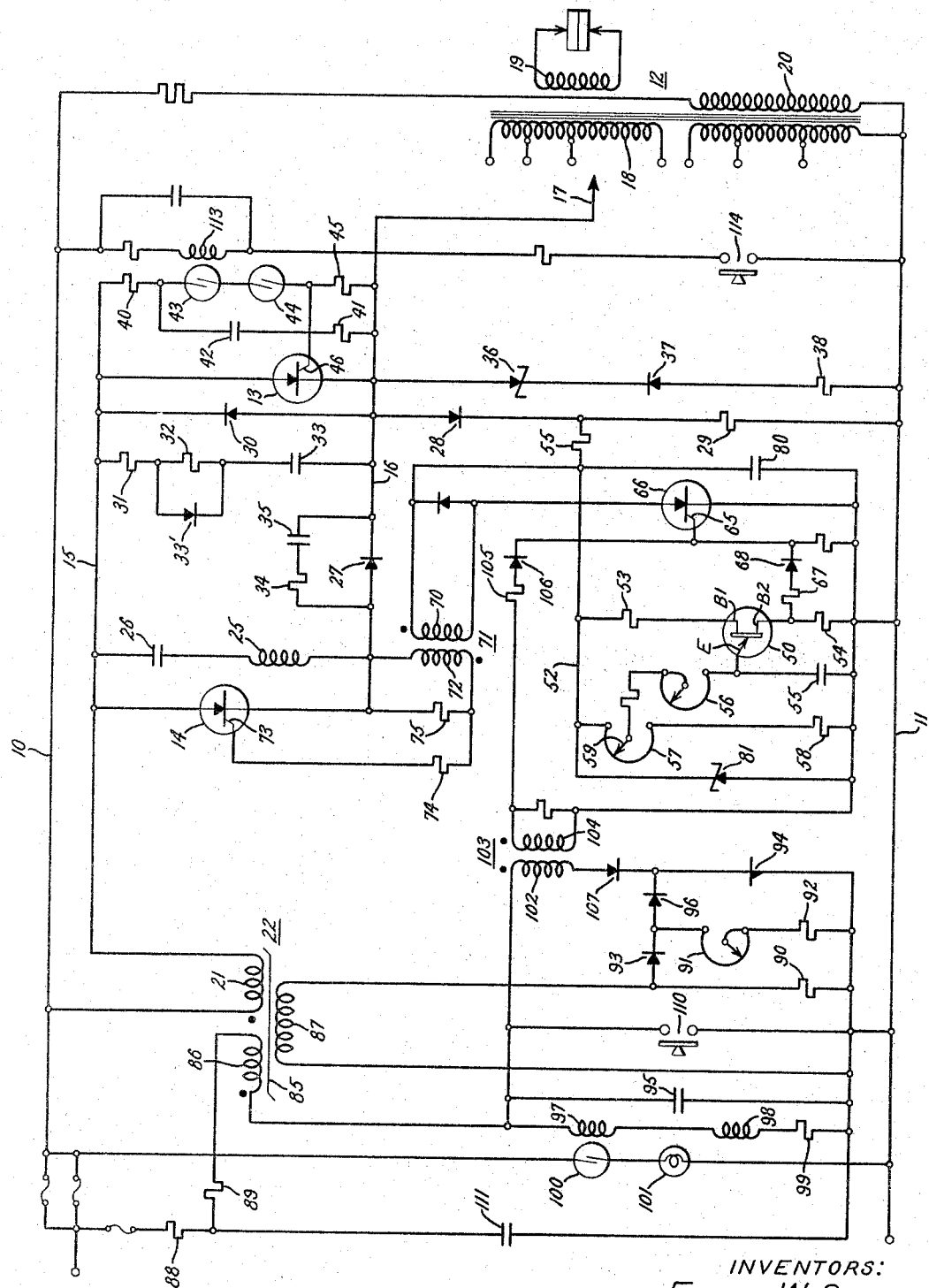

3,319,126
POWER SUPPLY
Frank W. Green, Cleveland Heights, Ohio, and Donald L. Watrous, Scotia, N.Y., assignors to General Electric Company, a corporation of New York
Filed Apr. 8, 1963, Ser. No. 271,400
11 Claims. (Cl. 317—33)

This invention relates to a power supply and has particular relation to control circuits for precisely and effectively controlling the application of power pulses to a load.

Pulse power supplies have previously been employed in a wide variety of applications for supplying power pulses to load devices. For example, pulse power supplies are employed in the welding field to supply power pulses to welding transformers. A very desirable pulse power supply is described and claimed in application S.N. 155,333, now Patent No. 3,233,116 filed Nov. 28, 1961 by Donald L. Watrous and assigned to the assignee of the present invention. The power supply there described includes a pair of controlled rectifiers, a first rectifier being effective when conducting to supply load current to a welding transformer and the second rectifier being included in a commutating circuit which is arranged to render the first rectifier nonconducting in response to conduction of the second rectifier. The width of the load current pulse is controlled by a timing circuit which begins operating in response to conduction of the first rectifier and after a preselected time, produces a timing pulse which is applied to the second rectifier to effect conduction of the second rectifier and initiate the commutating action.

It is desirable that timing circuits for controlling pulse power supplies have provision for producing a timing pulse of the proper amplitude and width for effectively terminating the application of a power pulse to a load. In the power supply described in the aforementioned application the amplitude of the timing pulse must necessarily be sufficient to assure that the second rectifier is rendered conductive. Further, the width of the timing pulse should be less than the period of conduction of the second rectifier to prevent refiring of the second rectifier. This problem becomes particularly troublesome when it is realized that the period of conduction of the second rectifier during the commutating interval is of the order of thirty-five microseconds. In addition, it is possible with timing circuits of prior design that an additional timing pulse could be generated during a commutating interval initiated by a first timing pulse and this could result in failure of the first rectifier to turn off. The power supply of the abovementioned application also incorporates overload detection means effective in response to an overload condition of load current to generate a control pulse which is applied to the second rectifier conductive. It is possible that such a control pulse could be applied to the second rectifier during a commutating interval initiated by a timing pulse or that a timing pulse could be applied to the second rectifier during a commutating interval initiated by a control pulse, the result being in either case that the first rectifier may fail to turn off. It is therefore necessary that provision be made for preventing the application of additional pulses to the second rectifier from either the timing circuit or the overload detection means during a commutating interval.

It is accordingly a primary object of the present invention to provide a novel and improved control circuit for precisely and effectively controlling the application of power pulses to a load device.

It is another object of the invention to provide a novel and improved control circuit which is capable of generating an output pulse a preselected time after a load supplying electronic valve is rendered conductive for turning off the valve and which is arranged to positively prevent the generation of additional output pulses during the turnoff period.

It is a further object of the invention to provide a novel and improved control circuit for generating an output pulse of proper amplitude and width for assuring turn off of a load current supplying electronic valve in response to the elapse of a preselected period of conduction of the valve and also in response to the occurrence of an overload condition of the load current.

It is still another object of the invention to provide a novel and improved pulse power supply including an electronic valve for supplying power pulses to a load, overload detection means for generating a control pulse in response to an overload condition of load current, a timing circuit for generating a timing pulse a preselected time after initiation of the power pulse and means for generating an output pulse in response to production of either a control pulse or a timing pulse for turning off the valve.

It is a still further object of the invention to provide a power supply as defined in the preceding object wherein the means which generates the output pulse is arranged so that an additional pulse cannot be generated during the turn off period.

In carrying out the invention in one form the power supply includes a pair of electronic valves supplied by current from direct current power supply terminals. The arrangement is such that a first valve when conducting supplies a power pulse to a load and a commutating circuit is provided including the second valve effective when the second valve is rendered conductive to turn off the first valve and terminate the power pulse. A control circuit is provided including a timing circuit and a pulse inhibit circuit, the timing circuit being effective a preselected time after conduction of the first valve is initiated to produce a timing pulse which is applied to the pulse inhibit circuit which in turn generates an output pulse for application to the second valve to initiate the commutating action. Overload detection means are provided for producing a control pulse in response to an overload condition of current supplied to the load, the control pulse also being applied to the pulse inhibit circuit to cause it to generate an output pulse. The arrangement is such that when either a timing pulse or a control pulse is applied to the pulse inhibit circuit, the pulse inhibit circuit generates a single pulse and prevents the generation of undesirable additional pulses during the ensuing commutating interval.

Other objects and advantages of the invention will become apparent from the following description taken in conjunction with the accompanying drawing in which the single figure is a schematic representation of a pulse power supply embodying the present invention.

The present invention is advantageously employed with pulse power supplies of the type described and claimed in the aforementioned patent. The single and multipulse power supplies there disclosed are particularly suited for welding applications and while the present invention is applicable to either the single or the multipulse supply, it will be described in connection with the single pulse supply.

The single pulse power supply includes power conductors 10 and 11 connected to any suitable source of direct current of the required potential, such as one hundred and twenty volts, the conductor 10 being at the more positive potential. In order to control the application of power from the conductors 10 and 11 to a load 12, shown in the form of a welding transformer, a switching circuit is provided including a pair of electric valves 13 and 14 which are preferably in the form of silicon controlled rectifiers including gate electrodes. Such rectifiers are well known and are effective to block the flow of current in the reverse direction until the avalanche voltage is reached, and also are effective to block the flow of current in the forward direction until the forward breakover voltage is attained. The rectifier can also be gated into a high conducting state when the forward voltage is less than the breakover voltage by application of a gating signal to the gate electrode. When a gating signal is applied, the rectifier will enter a high conducting state and will remain in such state even when the gating signal is removed until the forward current flow therethrough is interrupted or diverted. The rectifier is then effectively turned off and regains its forward blocking capabilities.

In order to control the application of power to the transformer 12 the rectifier or static switch 13 is connected across conductors 15 and 16 and is in series with an adjustable tap 17 for the primary winding 18 of transformer 12, the transformer 12 also having a secondary winding 19 and a bias winding 20 connected across the conductors 10 and 11. The conductor 16 is connected to conductor 11 through the tap 17 and through primary winding 18 whereas the conductor 15 is connected to conductor 10 through primary winding 21 of a current transformer 22 forming part of the overload detection means described hereinafter. Rectifier 13 is rendered conductive by means of a control circuit also described hereinafter.

In order to terminate conduction of rectifier 13 for terminating the power pulse supplied to transformer 12, a commutating circuit is provided including the controlled rectifier 14 which is connected across conductors 15 and 16. The commutating circuit also includes an oscillatory circuit which includes an inductor 25 and a capacitor 26 connected in series across the conductors 15 and 16 and in parallel with the rectifier 14. The charging path for capacitor 26 may be traced from conductor 10 through the primary winding 21, a part of conductor 15, capacitor 26, inductor 25, a diode 27 connected in conductor 16, a diode 28 and a resistor 29 to the conductor 11. A diode 30 is connected across conductors 15 and 16 in parallel with rectifier 13 and is included with diode 27 in a discharge path for capacitor 26. Resistors 31 and 32 and a capacitor 33 are connected in series across conductors 15 and 16 and in parallel with diode 30 and rectifier 13 to form a transient voltage suppressor. A diode 33' is connected across resistor 32 to clamp the cathode of rectifier 13 to capacitor 33 to limit the rate at which the rectifier cathode voltage can fall. A resistor 34 and a capacitor 35 are connected across diode 27. Diode 28 and resistor 29 constitute a dummy load which permits the switching circuit to operate under all conditions of loading of transformer 12. In order to limit the reset rate of transformer 12 so that the rectifiers 13 and 14 will not be subject to excessive voltage, the series connection of a Zener diode 36, a diode 37 and a resistor 38 are connected across conductors 11 and 16 in parallel with the primary 18 of transformer 12.

To describe the operation of the commutating circuit let it be assumed that power is applied to conductors 10 and 11 and that neither of the rectifiers 13 and 14 is conducting. For this condition capacitor 26 is charged through its previously described charging path. When the rectifier 13 is rendered conductive by its control circuit as will presently appear, a power pulse is delivered through rectifier 13 to the primary winding 18 of transformer 12 until such time as rectifier 14 is rendered conductive in response to operation of the timing circuit hereinafter described. When rectifier 14 is rendered conductive, the oscillatory circuit begins oscillation and during the first half cycle of oscillation, the capacitor 26 is discharged through the rectifier 14 and inductor 25, the capacitor 26 then discharging during the second half cycle through inductor 25, diode 27 and diode 30. Discharge of capacitor 26 through diode 30 operates to apply a reverse voltage to both of the rectifiers 13 and 14 to thereby render the rectifier 13 nonconducting to terminate the application of a power pulse to the transformer 12. Rectifier 13 then remains in a nonconducting state until it is rendered conductive again by operation of its control circuit.

The control circuit for rendering rectifier 13 conductive includes resistors 40 and 41 and a capacitor 42 connected across conductors 15 and 16 in series, and contacts of a switch 43 connected in series with contacts of a switch 44 and a resistor 45, these series connected elements being in parallel with resistor 41 and capacitor 42. The switches 43 and 44 preferably comprise magnetic reed switches and are operated in a manner described hereinafter. The gate electrode 46 of rectifier 13 is connected between the switch 44 and resistor 45. Contacts of switch 43 are normally open and may be closed in any suitable manner to initiate a welding operation. Contacts of switch 44 are operated by the overload detection means and are held closed by the overload detection means until an overload occurs as will presently appear. When contacts of switch 43 are closed, capacitor 42 discharges through closed contacts of the switches 43 and 44 and resistors 45 and 41 to apply a gating pulse to rectifier 13 for turning rectifier 13 on.

In order to supply gating pulses to controlled rectifier 14 for rendering rectifier 14 conductive a predetermined time after rectifier 13 begins conducting, the present invention provides a control circuit including a timing circuit and a pulse inhibit circuit which operate to render rectifier 14 conductive a predetermined adjustable time after rectifier 13 is rendered conductive. In the illustrated embodiment, the timing circuit includes a unijunction transistor 50 having two base electrodes B1 and B2 which are connected across conductors 11 and 52 through resistors 53 and 54. The conductor 52 is connected to a point between diode 28 and resistor 29 through a resistor 55. The control potential for the emitter E of the transistor 50 is supplied from an RC network consisting of a capacitor 55', a variable resistor 56 and an adjustable portion of a calibrating potentiometer 57 all connected in series across the conductors 11 and 52. Potentiometer 57 is connected in series with a resistor 58 across conductors 11 and 52 and includes an adjustable tap 59 leading to the resistor 56. The emitter E is connected to a point between capacitor 55' and resistor 56. When voltage is applied to conductors 11 and 52, capacitor 55' will charge through a portion of potentiometer 57, and resistor 56 and when the voltage on capacitor 55' reaches the peak point potential of emitter E, the transistor 50 will fire and capacitor 55' will discharge through transistor 50 and resistor 54. The time delay period may be readily adjusted by varying the resistance of resistor 56.

At the end of the timing period the output voltage pulse appearing across resistor 54 is applied to the gate electrode 65 of a silicon controlled rectifier 66 through a resistor 67 and a diode 68 to render the rectifier 66 conductive. The rectifier 66 forms part of the pulse inhibit circuit and is connected in series with the primary winding 70 of an air core pulse transformer 71, the rectifier 66 and primary winding 70 being connected across conductors 11 and 52. Transformer 70 includes a secondary winding 72 connected to the gate electrode 73 of rectifier 14 through a resistor 74. A resistor 75 is in parallel with winding 72. In order to apply a gating pulse to gate electrode 73 of rectifier 14 in response to termination of the timing period, the present invention provides a capacitor 80 in the pulse inhibit circuit which is connected across conductors 11 and 52 in parallel with rectifier 66 and primary winding 70. The timing and pulse inhibit circuits are connected across the dummy load resistor 29 for energization from voltage across the resistor 29 developed in response to energization of the primary winding 18 of transformer 12. The voltage impressed across these circuits is determined by a Zener diode 81 connected across the conductors 11 and 52.

It is thus seen that the timing and pulse inhibit circuits are placed into operation in response to initiation of conduction of rectifier 13 by its control circuit and determine the width of the power pulse supplied by rectifier 13 to the transformer 12.

To describe the operation, when rectifier 13 is switched to a high conducting state, capacitors 55' and 80 become charged with capacitor 55' charging at a rate slower than the charging rate of capacitor 80. After a preselected time determined by the time constant of the RC circuit, unijunction transistor 50 fires to effect discharge of capacitor 55' through resistor 54 to thereby apply a gating pulse to gate 65 of rectifier 66 which is thus rendered conducting. When this occurs, capacitor 80 discharges through the primary 70 of pulse transformer 71 and through rectifier 66 whereby a voltage pulse is applied to gate 73 of rectifier 14 from the secondary winding 72 of the pulse transformer. Rectifier 14 is thus rendered conductive to initiate the commutating cycle for rendering rectifier 13 nonconductive to terminate the application of a power pulse to the primary 18 of transformer 12. The capacitor 80 and primary winding 70 form an oscillatory circuit and in accord with the invention the design of capacitor 80 and transformer 71 is such that the oscillation is sufficiently damped so that the rectifier 66 remains conducting during the entire commutating cycle, which requires approximately sixty-five microseconds, with the result that the capacitor 55' cannot again be charged to fire transistor 50 during the commutating cycle. The generation of a second pulse by the timing circuit during the commutating cycle adversely affects operation of the circuit and in many cases will prevent turnoff of the rectifier 13. It is thus seen that the pulse inhibit circuit prevents the generation of additional pulses by the timing circuit during the commutating cycle.

When the power pulse is removed from the transformer 12, the rectifier 66 is reset automatically to its nonconducting condition and the timing and pulse inhibit circuits are prepared to operate in response to application of the next power pulse to transformer 12. Provision of the pulse inhibit circuit additionally assures that a turn-on pulse of proper amplitude and width is coupled to the rectifier 14. The arrangement is such that the inductance of transformer 71 and the capacitance of capacitor 80 resonate to establish the width of the pulse produced by transformer 71 so that the pulse width is less than the period of conduction of rectifier 14 which is approximately thirty-five microseconds. This is a very advantageous result and prevents undesirable refiring of the rectifier 14 which could occur if the width of the turn-on pulse were greater than the period of conduction of rectifier 14. As will presently appear, the invention provides that a pulse generated by the overload detection means is applied to the rectifier 14 through the pulse inhibit circuit in the manner of the pulse generated by the timing circuit.

The overload detection circuit is described and claimed in application S.N. 266,903, now Patent No. 3,260,916, filed Mar. 21, 1963, by Donald L. Watrous and assigned to the assignee of the present invention. This circuit is provided for protecting the rectifier 13 and for preventing the application of power pulses to the transformer 12 in response to a current overload condition. The detection circuit includes a sensing portion which monitors the current supplied to the rectifier 13, and includes also a decision portion which operates when such current attains a predetermined value to generate a plurality of control pulses, a first pulse being effective to render the rectifier 14 conductive for initiating the commutating cycle, a second pulse being effective to disable the control or turn-on circuit for rectifier 13, and a third pulse being effective to operate a suitable indicating device. In the illustrated embodiment the sensing portion of the detection circuit includes the current transformer 22 having a magnetic core 85 preferably formed of a material having a high flux density, such as Deltamax. The primary winding 21 surrounds the core and is connected to the conductor 10 in the path for current supplied to rectifier 13. A pair of additional windings 86 and 87 surround the core 85, the winding 86 constituting a bias winding which, in the illustrated embodiment, is connected for energization from the conductors 10 and 11 through resistors 88 and 89 and through impedance means referred to hereinafter to establish a bias flux which places the core 85 in a condition of negative saturation in the absence of current in the primary winding 21. The winding 87 constitutes a secondary winding which has induced therein a voltage in response to energization of the primary winding 21. The secondary winding 87 has one of its terminals connected to conductor 11 and is across a resistor 90 which is connected across the series combination of a potentiometer 91 and a resistor 92 through a diode 93.

The decision portion of the overload detection circuit includes a breakdown device 94 which is preferably in the form of a PNPN diode, also known as a Shockley diode, and which is connected in the discharge path for a capacitor 95. The device 94 is of such a nature that it prevents the flow of appreciable current in the forward direction, which is in a downward direction in the drawing, until the anode-cathode voltage exceeds the breakdown voltage of the device. When this occurs, the device enters a high conduction state to freely pass current in a forward direction at which time the forward voltage across the device drops to a very low value. The breakdown voltage of the device is very stable and is substantially independent of temperature variations. The device remains in a high conduction state so long as current passing through it remains above a certain holding level. It can be appreciated that a breakdown device other than a PNPN diode can be employed such, for example, as a silicon controlled rectifier connected to breakdown in the forward direction in response to anode-cathode voltage instead of in response to a gating signal. A diode 96 is connected between the upper terminals of the potentiometer 91 and the breakdown device 94, the diode 96 being poled in the same direction as diode 93 and preventing the flow of bias current through potentiometer 91 and resistor 92 prior to breakdown of the device 94.

The overload detection means includes one or more control signal producing means which are connected to be actuated in response to breakdown of the device 94 and resulting discharge of capacitor 95 to furnish control signals to open the static switch 13 and prevent the application of load current pulses to the transformer 12. In the illustrated embodiment the control signal producing means includes a pair of magnetic reed switch relays having respectively control windings 97 and 98 which are connected in series with a resistor 99 and which respectively surround reed switches 100 and 44, these switches having contacts which are closed when the windings 97 and 98 are energized. As previously pointed out the contacts of switch 44 are connected in series with the contacts of switch 43 in the turn-on control circuit, and the contacts of switch 100 are connected in series with a suitable overload indicator such as a neon lamp 101. The windings 97 and 98 and the resistor 99 constitute impedance means connected across the capacitor 95 and in series with the bias winding 86, the impedance means thus being continuously energized by bias current so that the windings 97 and 98 hold their associated contacts in a closed condition prior to breakdown of the device 94. The impedance means also serves the additional function of developing a voltage in response to the continuous energization thereof which effects charging of the capacitor 95. As will appear hereinafter, the bias current through the windings 97 and 98 is diverted therefrom in response to breakdown of the device 94 which results in deenergization of the windings 97 and 98 and resultant opening of the contacts of switches 44 and 100.

Additional control signal producing means is connected to respond to discharge of the capacitor 95 to furnish a signal which operates to render the rectifier 14 conductive which initiates the commutating cycle to render the rectifier 13 nonconductive. For this purpose the primary winding 102 of an air core transformer 103 is connected in the discharge path of capacitor 95 and when the capacitor discharges, current through the winding 102 causes voltage to be induced in the secondary winding 104 of transformer 103, such induced voltage being coupled to the gate 65 of the controlled rectifier 66 in the pulse inhibit circuit. For this purpose the winding 104 is connected to the gate 65 of rectifier 66 through a resistor 105 and a diode 106. A diode 107 is connected between the device 94 and the winding 102 and is poled in such a direction as to decouple the capacitor 95 from the sensing portion of the overload detection circuit so that a time delay is not introduced in the breakdown of device 94.

To describe operation of the overload detection circuit let it be assumed that voltage is applied to conductors 10 and 11 and that both rectifiers 13 and 14 are nonconducting. For this condition bias current flows through bias winding 86 and generates magnetic flux which places the core of current transformer 22 in a condition of negative saturation since load current is not flowing through primary winding 21 at this time. In addition, the bias current also flows through the windings 97 and 98 so that these windings are energized and the associated reed switch contacts are closed. The voltage developed across the impedance means comprising windings 97 and 98 and resistor 99 by bias current flowing therethrough charges the capacitor 95 to a voltage which is selected to be less than the breakdown voltage of the device 94.

In order to initiate a welding operation, switch 43 is closed in a manner to be described which renders rectifier 13 conductive to thereby supply load current to transformer 12. Flux produced by load current flowing in winding 21 drives the magnetic core of transformer 22 towards positive saturation to induce voltage in the secondary winding 87. The transformer 22 is designed so that its core does not saturate during load current pulses and so that the magnitude of current resulting from voltage induced in the winding 87 is substantially proportional to the magnitude of load current in the primary winding 21. The current produced by voltage induced in winding 87 flows through two paths, one of which includes the resistor 90 and the other of which includes the diode 93, potentiometer 91 and resistor 92 in series. The ratio of the impedances in the two current paths is such that substantially all of the secondary current flows through the latter path, the voltage drop developed across potentiometer 91 and resistor 92 having a magnitude substantially proportional to the magnitude of the load current energizing the primary winding 21.

In the event that voltage developed across potentiometer 91 and resistor 92 exceeds the breakdown voltage of device 94, indicating an overload condition of load current, the device 94 rapidly transfers from a high impedance, nonconducting condition to a low impedance, high conducting condition. By adjusting the potentiometer 91 the level of the load current at which the device 94 breaks down can be varied over a substantial range. When device 94 breaks down, capacitor 95 discharges through primary winding 102 of transformer 103, diode 107 and device 94. The discharge current flowing through winding 102 results in induction of a voltage pulse in secondary winding 104 which is coupled to the gate 65 of controlled rectifier 66 to render the rectifier 66 conductive which causes capacitor 80 to discharge through the primary winding 70 of transformer 71. A voltage pulse is thus induced in secondary winding 72 which is applied to the gate 73 of rectifier 14 to render rectifier 14 conductive for initiating the commutating cycle. It has been demonstrated by test that the rectifier 66 is rendered conducting about two microseconds after the device 94 breaks down, and that rectifier 14 is rendered conducting approximately two microseconds after conduction of rectifier 66 is initiated. Since rectifier 66 conducts throughout the commutating cycle, an additional pulse cannot be produced by transformer 71 in response to generation of a pulse by the overload detection circuit during a commutating cycle.

When the device 94 breaks down, the bias current flowing through the switch windings 97 and 98 is diverted therefrom through the device 94 with the result that the contacts of reed switches 44 and 100 are opened. Opening of contacts of switch 44 effectively disables the control circuit so that the controlled rectifier 13 cannot be rendered conductive in response to closure of contacts of switch 43. Opening of contacts of switch 100 causes the neon lamp 101 to be extinguished. If desired, lamp 101 may be connected in parallel with switch 100 and in series with a resistor so that the lamp is lit when switch 100 opens. Breakdown of device 94 also results in the secondary current produced by voltage induced in the winding 87 being diverted through the device 94, and this current plus the diverted bias current operates to hold the device 94 in a high conducting state. The value of the bias current is selected to be larger than the holding current for the device 94 so that device 94 is held in a high conducting state throughout the interval of the load current pulse. When the load current pulse is terminated, the bias current flowing through bias winding 86 operates to reset the core of transformer 22 to a negative saturated condition.

In order to render the device 94 nonconducting for resetting the overload detection circuit a normally open switch 110 is connected in series with the bias winding 86 and in parallel with the impedance means consisting of windings 97 and 98 and resistor 99. Momentary closure of switch 110 in any suitable manner is effective to interrupt current flow through device 94 for rendering the device nonconducting and restoring the circuit to its normal condition.

Capacitor 95 and the inductance of transformer 103 form a resonant circuit the discharge frequency of which is made high, such as fifty kilocycles per second, so that a minimum delay occurs between the breakdown of device 94 and the generation of the voltage pulse in the secondary winding 104. The detection circuit is also failsafe in that interruption of bias current for any reason results in opening of the contacts of the several reed switches. A capacitor 111 is connected between conductor 11 and a point between resistors 88 and 89, capacitor 111 and resistor 88 forming a filter circuit which limits the rate of application of bias voltage to prevent undesired oscillations in the detection circuit.

As previously stated, initiation of a welding operation is effected by closing switch 43 in the control circuit. In the illustrated embodiment, switch 43 is in the form of a magnetic reed switch and is closed in response to energization of a control winding 113 surrounding the reed switch. The winding 113 is connected for energization from conductors 10 and 11 through a normally open switch 114, which may be a manually actuated push button switch, the switch 114 when actuated closed effecting energization of winding 113 to close switch 43.

While we have shown and described particular embodiments of our invention, it will be obvious to those skilled in the art that various changes and modifications may be made without departing from our invention in its broader aspects, and we, therefore, intend in the appended claims to cover all such changes and modifications as fall within the true spirit and scope of our invention.

What we claim as new and desire to secure by Letters Patent of the United States is:

1. A control circuit for producing a control signal comprising, a pair of input terminals, a zener diode connected between said terminals to establish a predetermined voltage between said terminals upon energization of said terminals, a timing circuit connected to said terminals for producing an output quantity a predetermined time after said predetermined voltage is established between said terminals, a capacitor connected to said terminals to be charged in response to energization of the terminals, an electronic valve connected in the discharge path for said capacitor and connected to said timing circuit for energization by said output quantity, said valve being operable when energized by said output quantity to transfer from a nonconducting condition to a conducting condition to effect discharge of said capacitor, and means responsive to discharge of said capacitor to produce a control signal.

2. A circuit as defined in claim 1 wherein said last-named means comprises a pulse transformer having a primary winding in the discharge path for said capacitor.

3. A control circuit for producing a control signal comprising, a pair of input terminals, a timing circuit connected to said terminals for producing an output quantity a predetermined time after energization of said terminals, a capacitor connected to said terminals to be charged in response to energization of the terminals, a controlled rectifier connected in the discharge path for said capacitor, said rectifier having a gate electrode connected to said timing circuit for energization by said output quantity, said rectifier being operable when its gate electrode is energized to transfer from a nonconducting condition to a conducting condition for effecting discharge of said capacitor, and means responsive to discharge of said capacitor to produce a control signal, said rectifier when conducting inhibiting operation of said timing circuit.

4. A circuit as defined in claim 3 wherein said last named means comprises a pulse transformer having a primary winding in the discharge path for said capacitor.

5. A control circuit for producing a control signal comprising, a pair of input terminals, a timing circuit including a first capacitor connected to be charged in response to energization of said terminals, and a first electronic valve connected to said first capacitor to be transferred from a nonconducting condition to a conducting condition when said first capacitor is charged to a predetermined voltage; a second capacitor connected to said terminals to be charged in response to energization of said terminals, a second electronic valve connected in the discharge path for said second capacitor and connected to said first valve to be transferred from a nonconducting condition to a conducting condition in response to transfer of said first valve to a conducting condition for effecting discharge of said second capacitor, and means responsive to discharge of said second capacitor for producing a control signal.

6. A control circuit for producing a control signal comprising, a pair of input terminals, a timing circuit including a first capacitor connected to be charged in response to energization of said terminals, and a first electronic valve connected to said first capacitor to be transferred from a nonconducting condition to a conducting condition when said first capacitor is charged to predetermined voltage; a second capacitor connected to said terminals to be charged in response to energization of said terminals, a controlled rectifier connected in the discharge path for said second capacitor, said rectifier having a gate electrode connected for energization in response to transfer of said first valve to a conducting condition, said rectifier being transferred from a nonconducting condition to a conductnig condition when its gate electrode is energized for effecting discharge of said second capacitor, and means responsive to discharge of said second capacitor for producing a control signal including a pulse transformer having a primary winding in the discharge path for said second capacitor, said rectifier when conducting preventing charging of said first capacitor.

7. A control circuit for producing a control signal comprising, a pair of input terminals, a timing circuit including a variable resistor, a first capacitor connected to be charged through said resistor in response to energization of said terminals, and a unijunction transistor having an emitter electrode connected to said first capacitor, said transistor being transferred from a nonconducting condition to a conducting condition when said first capacitor is charged to a predetermined voltage; a second capacitor connected to said terminals to be charged in response to energization of said terminals, a controlled rectifier connected in the discharge path for said second capacitor, said rectifier having a gate electrode connected for energization in response to transfer of said unijunction transistor to a conducting condition said rectifier being transferred from a nonconducting condition to a conducting condition when its gate electrode is energized for effecting discharge of said second capacitor, and means responsive to discharge of said second capacitor for producing a control signal including a pulse transformer having a primary winding in the discharge path for said second capacitor, said rectifier when conducting preventing charging of said first capacitor.

8. A pulse power supply comprising, means including a first electronic valve effective when rendered conducting for supplying load current to a load, an overload detection circuit operable in response to an overload condition of load current to produce a first control signal, a timing circuit operable to produce a second control signal a predetermined time after said first valve is rendered conductive, a capacitor connected to be charged in response to conduction of said first valve, a second electronic valve in the discharge path for said capacitor operable when rendered conductive to effect discharge of said capacitor, means connecting said second valve to said overload detection circuit and to said timing circuit to render said second valve conductive in response to the production of either of said first or second signals, and means responsive to discharge of said capacitor for rendering said first valve nonconducting.

9. A pulse power supply comprising, means including a first electronic valve effective when rendered conducting for supplying load current to a load, an overload detection circuit operable in response to an overload condition of load current to produce a first control signal, a timing circuit operable to produce a second control signal a predetermined time after said first valve is rendered conductive, a capacitor connected to be charged in response to conduction of said first valve, a second electronic valve in the discharge path for said capacitor operable when rendered conductive to effect discharge of said capacitor, means connecting said second valve to said overload detection circuit and to said timing circuit to render said second valve conductive in response to production of either of said first or second signals, and means responsive to discharge of said capacitor for rendering said first valve nonconducting, said last-named means comprising an oscillatory circuit operable to render said first valve nonconducting, a third electronic valve connected to said oscillatory circuit operable when rendered conductive to effect operation of said oscillatory circuit, and a pulse transformer including a primary winding in the discharge path for said capacitor and including a secondary winding connected to said third valve to render said third valve conductive in response to discharge of said capacitor through said primary winding.

10. A pulse power supply comprising, means including a first controlled rectifier effective when rendered conducting for supplying load current to a load, an overload detection circuit operable in response to an overload condition of load current to produce a first control signal, a timing circuit operable to produce a second control signal a predetermined time after said first rectifier is rendered conductive, a capacitor connected to be charged in response to conduction of said first rectifier, a second controlled rectifier in the discharge path for said capacitor operable when rendered conductive to effect discharge of said capacitor, means connecting said second rectifier to said overload detection circuit and to said timing circuit to render said second rectifier conductive in response to the production of either of said first or second signals, and means responsive to discharge of said capacitor for rendering said first rectifier nonconducting including a pulse transformer having a primary winding in the discharge path for said capacitor.

11. A pulse power supply comprising, means including a first controlled rectifier effective when conductive to supply load current to a load, an overload detection circuit operable in response to an overload condition of load current to produce a first control signal, a timing circuit including input terminals energizable in response to conduction of said first controlled rectifier, a first capacitor connected to be charged in response to energization of said terminals, and means responsive to charging of said first capacitor to produce a second control signal; a second capacitor connected to said input terminals to be charged in response to energization of said timing circuit, a second controlled rectifier in the discharge path of said second capacitor operable when rendered conductive to effect discharge of said second capacitor, means connecting said second rectifier to said overload detection circuit and to said timing circuit to render said second rectifier conductive in response to production of either of said first or second control signals, and means for rendering said first rectifier nonconducting including a pulse transformer having a primary winding in the discharge path for said second capacitor, said second rectifier when conducting preventing charging of said first capacitor.

References Cited by the Examiner

UNITED STATES PATENTS

| | | | |
|---|---|---|---|
| 3,133,209 | 5/1964 | Greenwood | 317—33 X |
| 3,154,725 | 10/1964 | Kadah | 317—148.5 X |
| 3,211,958 | 10/1965 | Miller | 317—36 X |

MILTON O. HIRSHFIELD, *Primary Examiner.*

J. D. TRAMMELL, *Assistant Examiner.*